(12) United States Patent
Baughman et al.

(10) Patent No.: US 11,188,317 B2
(45) Date of Patent: Nov. 30, 2021

(54) CLASSICAL ARTIFICIAL INTELLIGENCE (AI) AND PROBABILITY BASED CODE INFUSION

(71) Applicant: INTERNATIONAL BUSINESS MACHINES CORPORATION, Armonk, NY (US)

(72) Inventors: Aaron K. Baughman, Cary, NC (US); Gary William Reiss, Buford, GA (US); Qiqing Christine Ouyang, Yorktown Heights, NY (US); Shikhar Kwatra, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 127 days.

(21) Appl. No.: 16/813,819

(22) Filed: Mar. 10, 2020

(65) Prior Publication Data

US 2021/0286603 A1    Sep. 16, 2021

(51) Int. Cl.
*G06F 9/44* (2018.01)
*G06F 8/41* (2018.01)
(Continued)

(52) U.S. Cl.
CPC .............. *G06F 8/451* (2013.01); *G06F 8/447* (2013.01); *G06N 3/04* (2013.01); *G06N 3/08* (2013.01); *G06N 10/00* (2019.01)

(58) Field of Classification Search
None
See application file for complete search history.

(56) References Cited

U.S. PATENT DOCUMENTS

| 5,793,091 A | 8/1998 | Devoe |
| 6,578,018 B1 | 6/2003 | Ulyanov |

(Continued)

FOREIGN PATENT DOCUMENTS

| EP | 1083520 A2 | 3/2001 |
| WO | 2018084829 A1 | 5/2018 |

OTHER PUBLICATIONS

Roffe et al., "Quantum Codes From Classical Graphical Models," IEEE Transactions on Information Theory, vol. 66, No. 1, Jan. 2020 (Year: 2020).*

(Continued)

*Primary Examiner* — Insun Kang
(74) *Attorney, Agent, or Firm* — Anthony R. Curro

(57) ABSTRACT

A method, a computer system, and a computer program product for parallel conversion is provided. Embodiments of the present invention may include analyzing raw classical code using a code embedded deep learning model. Embodiments of the present invention may include analyzing running classical code using a deep learning model. Embodiments of the present invention may include marking a location of the raw classical code for a first quantum conversion. Embodiments of the present invention may include suggesting a memory size of the running classical code for a second quantum conversion. Embodiments of the present invention may include aggregating the raw classical code for the first quantum conversion. Embodiments of the present invention may include aggregating the running classical code for the second quantum conversion.

14 Claims, 6 Drawing Sheets

(51) Int. Cl.
*G06N 3/08* (2006.01)
*G06N 10/00* (2019.01)
*G06N 3/04* (2006.01)

(56) References Cited

U.S. PATENT DOCUMENTS

| | | | |
|---|---|---|---|
| 7,620,672 | B2 | 11/2009 | Tucci |
| 10,817,337 | B1* | 10/2020 | Richardson ............ G06F 9/5027 |
| 2006/0224547 | A1 | 10/2006 | Ulyanov |
| 2016/0328253 | A1 | 11/2016 | Majumdar |
| 2017/0364796 | A1 | 12/2017 | Wiebe |
| 2018/0246851 | A1 | 8/2018 | Zaribafiyan |
| 2020/0410384 | A1* | 12/2020 | Aspuru-Guzik ......... G06N 7/08 |
| 2021/0064350 | A1* | 3/2021 | Cao .......................... G06F 8/443 |
| 2021/0224679 | A1* | 7/2021 | Misra ..................... G06N 10/00 |
| 2021/0256416 | A1* | 8/2021 | Bocharov .............. G06N 20/00 |

OTHER PUBLICATIONS

Barabasi et al., Quantum computing deep learning working together to solve optimization problems, IEEE (Year: 2019).*

"How many operations can a quantum computer perform per second?", https://quantumcomputing.stackexchange.com/questions/2402/how-man . . . , Accessed on Jun. 14, 2019, 1 page.

Aaronson, "The Polynomial Method in Quantum and Classical Computing", 2008 49th Annual IEEE Symposium on Foundations of Computer Science, 1 page.

Bovino, "On Chip IntraSystem Quantum Entangled States Generator", © 2017 European Union, 1 page.

Inouye, "Analysis of Classical and Quantum Resources for the Quantum Linear Systems Algorithm", 2013 10th International Conference on Information Technology: New Generations, 2013 IEEE, Conference Publishing Services, pp. 749-753.

Yamakami, "Quantum List Decoding from Quantumly Corrupted Codewords for Classical Block Codes of Polynomially Small Rate", (Extended Abstract), Copyright © 2007, Australian Computer Society, Inc., This paper appeared at the Thirteenth Computing: The Australasian Theory Symposium (CATS2007), Ballarat, Victoria, Australia, pp. 153-162.

Mell et al., "The NIST Definition of Cloud Computing", Recommendations of the National Institute of Standards and Technology, Special Publication 800-145, Sep. 2011, 7 pages.

Gavinsky et al., "Exponential Separation of Quantum and Classical One-Way Communucation Complexity for a Boolean Function", arXiv:quant-ph/0607174v1 Jul. 25, 2006, pp. 1-8.

Daneshgaran et al., "Classical Capacity of a Bayesian Inference Quantum Channel Employing Photon Counting Detectors", ISABEL '11, Oct. 26-29, Barcelona, Spain, 6 pages.

* cited by examiner

CLASSICAL ARTIFICIAL INTELLIGENCE (AI) AND PROBABILITY BASED CODE INFUSION

BACKGROUND

The present invention relates generally to the field of computing, and more particularly to artificial intelligence (AI). Classical computing may perform calculations and traditional numerical operations quickly. A higher volume of applications or computing intensive applications may cause performance issues on a classical computing system such that the amount of time for the programs to run may not be reasonable in a classical computing environment.

SUMMARY

Embodiments of the present invention disclose a method, a computer system, and a computer program product for parallel conversion. Embodiments of the present invention may include analyzing raw classical code using a code embedded deep learning model. Embodiments of the present invention may include analyzing running classical code using a deep learning model. Embodiments of the present invention may include marking a location of the raw classical code for a first quantum conversion. Embodiments of the present invention may include suggesting a memory size of the running classical code for a second quantum conversion. Embodiments of the present invention may include aggregating the raw classical code for the first quantum conversion. Embodiments of the present invention may include aggregating the running classical code for the second quantum conversion.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
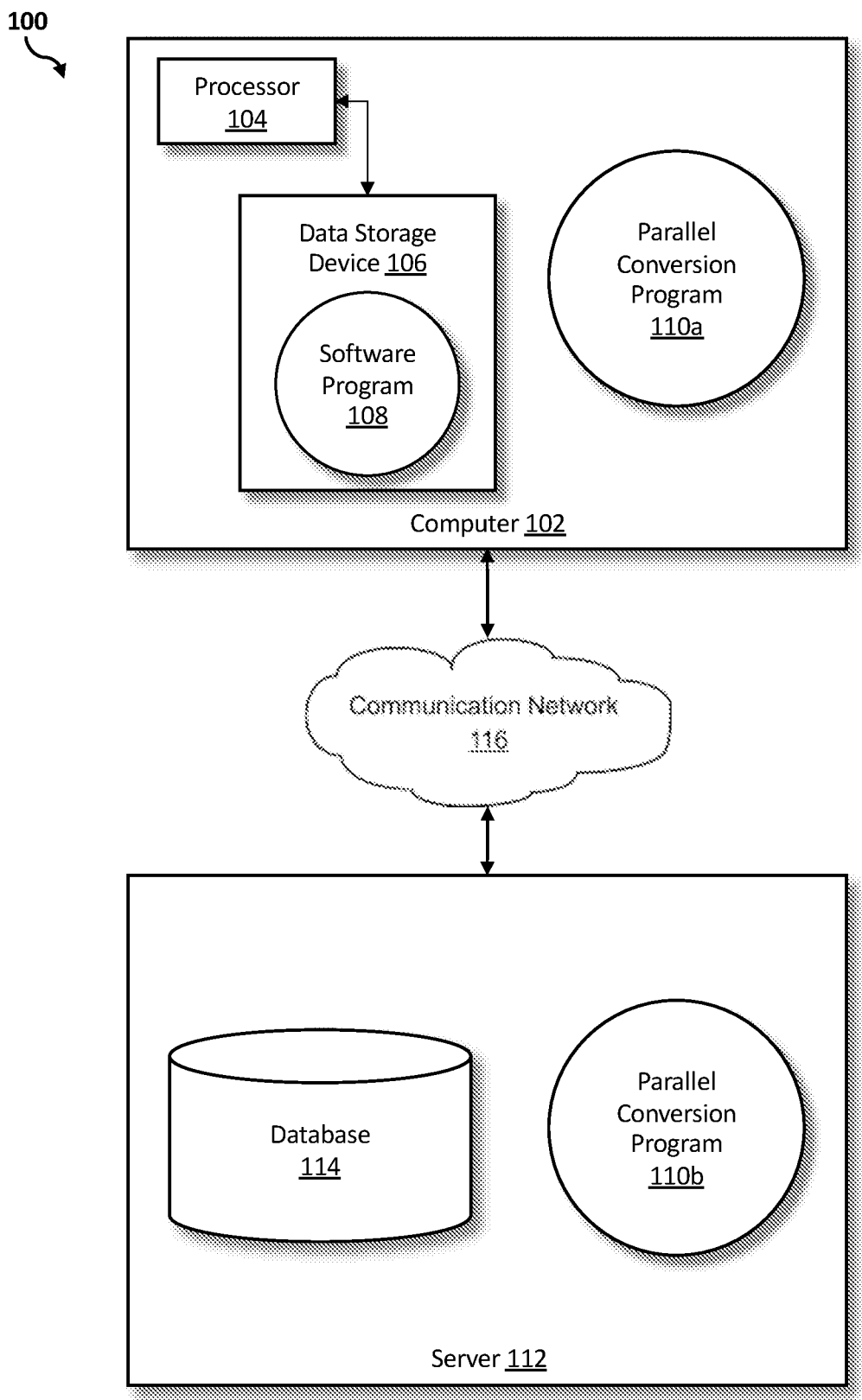
FIG. 1 illustrates a networked computer environment according to at least one embodiment.

Detailed embodiments of the claimed structures and methods are disclosed herein, however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

As previously described, classical computing may perform calculations and traditional numerical operations quickly. A higher volume of applications or computing intensive applications may cause performance issues on a classical computing system such that the amount of time for the programs to run may not be reasonable in a classical computing environment.

In a classical computing environment, the number of states that a binary computer with n bits can store is only one of $2^n$ states. The amount of information that may be stored in a quantum computer is much larger due to the quantum principles of superposition and entanglement that allow information to be stored within different states. A quantum computer with n qubit(s) can store all of the $2^n$ bits. A qubit is a unit of quantum information that can be in a coherent superposition of more than one state or level simultaneously. A qubit may also be known as a quantum bit or a qbit. Quantum computing may act as an accelerator to computer processing and may speed up bottlenecks that classical computers may encounter. Quantum computing may also solve problems that are not feasible or are not practically feasible on a classical computer.

High computationally intensive applications may be difficult to run on a classical computer within a reasonable amount of time. A classical computational algorithm may be converted to quantum computing in order to speed up the computational process. However, as more classical computational algorithms are converted for use on a quantum computer, quantum computing machines may still have a limited capacity of qubits. Therefore, it may be advantageous to, among other things, provide a system and method to determine which types of classical code or which sections of classical code can be converted to quantum code.

The following described exemplary embodiments provide a system, method and program product for parallel conversion. As such, embodiments of the present invention have the capacity to improve the technical field of artificial intelligence by using machine learning to determine which classical code may be converted to quantum code. More specifically, deep learning is used to identify parts or sections of classical code that can be converted to quantum code during runtime and during compile time. Quantum readiness is measured based on runtime tolerance for coherence uncertainty. Additionally, a determination is made relating to which snippets or sections may be replaced by a quantum library and which snippets or sections do not use a quantum compiler.

Additional benefits may include discovering which classical code can be converted into quantum code and storing the discoveries in a quantum library. The quantum library may also be used to infuse quantum code into classical code. For example, deep measurements of code at runtime and during compilation may be taken to determine if the code should be converted either from classical code to quantum code, or vice versa. Deep measurements may include the extraction of descriptions about the code and the application using deep learning models to the predictors of code at runtime. Determinations relating to whether the code should be converted either from classical code to quantum code, or vice versa. The determination may include factors such as a runtime signature (i.e., input-output (TO), memory, or flops) or an algorithm signature to determine is the code is a fit for quantum, or both factors may be analyzed.

Additionally, user behavior may be used to influence quantum computing infusion by determining which quantum computer algorithm may be needed or may be optimal. User behavior may include, for example, a user's risk assessment by measuring a user's risk level. The user's risk level may be measured by, for example, capturing biometric signals from sensors on a smart phone or a smart watch that receives biometric data. A map that represents a human's tolerance to risk to the operators of quantum computing may be created and used to determine if a piece of code has quantum readiness. For example, if the number of shots required using a shot number determination to get a probabilistic answer is beyond the human's tolerance for risk, the piece is not ready for quantum based on the user. Shots may include a form of sampling with quantum computing such that the higher number of shots may indicate that the observed probable answer or prediction will likely result.

Various types of ML models may be built and used to create predictive analytics and results for the various industries. ML models may also include deep learning models and neural networks. Training and updating a ML model may include supervised, unsupervised and semi-supervised ML procedures. Supervised learning may use a labeled dataset or a labeled training set to build, train and update a model. Unsupervised learning may use all unlabeled data to train a model. Semi-supervised learning may use both labeled datasets and unlabeled datasets to train a model.

A neural network may be a component of deep learning. A neural network may be related to or known as a deep network or a deep neural network. A neural network may interpret, label and classify raw data, such as unstructured data. A neuron in a deep neural network may combine input data and assign a weight to the input data based on a significance level of what the neural network is learning in order to classify the data. The deeper the neural network, the more neurons or node layers the input data passes through. A neuron, a node and a filter may be considered interchangeable terms. The neuron may represent the location that receives input data, produces and associates an input weight to the data and then determines, via a computation, if the data should continue or progress further in the network before the data is classified. Each layer of neurons may train the data based on the previous output layer.

Deep learning is a type of machine learning that may classify information based on the training data. The training data may be structured data or unstructured data. Structured data may include data that is highly organized, such as a spreadsheet, relational database or data that is stored in a fixed field. Unstructured data may include data that is not organized and has an unconventional internal structure, such as a portable document format (PDF), an image, a presentation, a webpage, video content, audio content, an email, a word processing document or multimedia content. Deep learning may also be related to or known as hierarchical learning or deep structured learning.

Deep learning may map an input, classify data, interpret datasets and provide an output of data for one or more layers of data. Each layer of data may be represented as a node. A node may also be known as a neuron or an artificial neuron. Deep learning may detect similarities in data that may or may not be labeled. For example, deep learning may operate as supervised learning, unsupervised learning or semi-supervised learning. Supervised learning may use a labeled dataset to train a ML model. Unsupervised learning may use all unlabeled data to train a ML model. Semi-supervised learning may use both labeled datasets and unlabeled datasets to train a ML model. The deep learning models may provide, for example, a graph output that may be generated as nodes and edges relating to the domain specific taxonomy that is being learned.

According to an embodiment, deep learning may be used to reduce the dimensionality of mapped features to the number of qubits on independent quantum chips given the number of algorithms to convert, the number of available quantum chips, the digital parallel operations and the user interactions of an application. Mapped features may include, for example, weather predictors, sports statistics or independent variables about a data state. Larger encoding processes may be placed on larger qubit quantum machines, such as in the knapsack problem. The knapsack problem is an optimization problem relating to resource allocation that is aimed at maximizing a resource without overextending or wasting resources.

According to an embodiment, deep learning may be used to determine which part of classical code may be converted into quantum computing algorithms. Input training data may include, for example, human biometric signals, shot number determination, lines of code, number of predictors or another feature that may describe a problem that a classical algorithm is trying to solve. Deep leaning may be used to assist the computing system to determine if a particular section of the code should or could use quantum computing. During training of the model, the labeled data may include system performance (e.g., the program is running on a classical computing system) and a probability that a solution is correct. A tradeoff may become apparent between a system performance and a number of shots used to sample a quantum algorithm for an answer.

An accuracy may be measured based on the system performance and a probability that the answer is correct. An answer key may also be used and accessed based on certain places or sections of code that a program should or could be using quantum computing. If a deep learning algorithm provides an incorrect answer, then the accuracy of the model may go down, and, correspondingly, if the deep learning algorithm provides a correct answer, then the accuracy of the model may go up. Deep learning algorithms used may, for example, include supervised machine learning that were previously trained.

According to an embodiment, a software code scan may be performed, such as a block format or a module format, using a statistical code analysis or a coverity tool, such as C, C++, Java or Javascript. The coverity tool may be used for coverage analysis to determine the number of computations, assignable vectors and clock operations in a classical computing environment that may be required to execute a certain block or code file. Coverage analysis may analyze the complexity of the code. The software code scan may be performed over any software code or a section of software code.

In quantum computing, calculating the number of operations a quantum computer may perform per second may be described based on the number of qubits. Although there currently may not be a standard answer to calculating the number of operations, an estimation may be performed or calculated based on a specific quantum chip. For example, an IBM Q® chip (IBM Q and all IBM Q-based trademarks and logos are trademarks or registered trademarks of International Business Machines Corporation and/or its affiliates).

Using a gate specification of the particular quantum chip may provide times in the forms of buffer times or computation times. These times may be based on a physical operation of the qubit and the physical operations may be used to find quantum gate decompositions. Since the quantum operations may include physical operations that may not appear as timing, a buffer time may, for example, represent a pause between physical operations. Calculating pauses between physical operations based on each gate may provide times for the numbers of operations, for example, 3,000,000 operations per second.

According to an embodiment, a particular module or section of code may be executed during run time, such as executing code that is currently being processed or running code. Time and clock cycles may be internally computed to execute the running code and the running blocks of code with a number of computations inclusive of computationally intensive operations and memory space. The internally computed cycles may provide a result that allows for an artificial exceeding (i.e., overclocking) or for a limit of computing resources to emulate other devices as mobile platforms. Operators or operands inputs may be correlated and stored in an embedded feature vector format of the program function. The embedded feature may describe or measure the behavior of the system's clocks that may also be used to input deep learning algorithms to determine if the section of code could or should be converted to quantum code.

A one to one comparison may be computed with a determination of the number of qubits that may be required to perform a similar operation. For example, a 555 timer may be used with a clock oscillator working in a hardware component to fetch the difference in computation time and qubits may be computed to store the calculated computation time or fetched vector operations. A 555 timer is an integrated circuit (IC) that is used to time various components, such as timing pulse generations or timing oscillator applications.

A code block that already contains quantum code may be analyzed or evaluated to determine if classical computing code should or could be substituted. Analyzing quantum code modules or quantum code enhancements (e.g., algorithms or libraries) using one or more deep learning networks may consider a classification of groups. For example, considering two classification groups using deep learning may include one classification group based on quantum computing and one classification based on classical computing. The quantum computing classification may include using Grover's search and amplitude amplification to obtain an up-to-quadratic speed-ups. The quantum computing classification may also include an approach to encode relevant information into quantum amplitudes and to identify which quantum amplitudes have a potential for exponential improvements.

A time difference may be calculated between the difference in the time execution of blocks of code and the availability of qubits to perform computationally intensive operations. The calculated difference may provide delta features between a digital operation and a quantum operation. The calculated difference may also determine if the code block should or could be used as quantum code or classical code. For example, an evaluation of the time difference may be performed by using auto-encoders or a principal component analysis (PCA) on the vectored variables and inputs. The evaluation may identify features that may be pruned, less relevant vectors, and features that may be retained, most relevant vectors, in order to maintain a similar or an improved accuracy.

For example, using a training dataset to label and classify the deep learning dataset, the following code may be used:
    def cancer{training_size, test_size, n, PLOT_DATA):
    class_labels=[r'A', r'B']
    data, target=datasets.load_cancer(True)
    sample_train, sample_test, label_train, label_test= train_test_split(data, target, test_size=0.3, random_state=12).
Standardizing the predictor for a gaussian distribution near zero with a unit variance of 1 may be represented as:
    std_scale=StandardScaler( ).fit(sample_train)
    sample_train=std_scale.transform(sample_train)
    sample_test=std_scale.transform(sample_test).
Reducing the number of features to a number of qubits may be represented as:
    pca=PCA(n_components=n).fit(sample_train)
    sample_train=pca.transform(sample_train)
    sample_test=pca.transform(sample_test).

A threshold of risk of 5% tolerance may be allocated to the vectors. A user may set the threshold risk. If the fault tolerance threshold is crossed, then the module will switch from quantum computing to using or performing the execution using a classical approach or classical computing.

A deep learning neural network (DLNN) model may be used to classify multiple program fragments. For example, the pre-trained model may provide windows of code analysis when features are extracted from the code and runtime performance. The extracted features may assist in determining if the code should or could be executed as quantum code or classical code. The deep learning neural network model may also be used to categorize the computations and similar modules that can be processed using a k-means clustering algorithm to determine if the code may be executed using classical computing or if the code may be executed by deploying qubits and using quantum operations.

A graphical user interface (GUI) or a user interface (UI) may be used for filtering, delaying or changing the characteristics and highlighting the nature of the code blocks that are to be executed by either classical computing methods or quantum computing methods. The UI may display markers or highlights placed around the code blocks based on the distinction of which computing method will be used to process the block of code that is marked or highlighted on the UI. A software analysis may then be used to analyze the features and characteristics that were used to determine the recommended action of processing the code block on a classical computer or processing the code block using a quantum computer.

For example, a GUI may show a program or application with multiple blocks of code. Each block may, for example, be highlighted using two different colors where one color of the highlighted code represents a classical computing method and the second color highlighted code represents a quantum computing method. A physical representation of each block of code is presented such that quick and easy identification of the results of the deep learning model recommendation as to which part of the code should be processed by a classical computer and which parts of the code should be processed by a quantum computer.

According to an alternate embodiment, a photonic quantum circuit that mimics a neural network may be used to classify the code as being required to calculated using either classical computing methods or quantum computing methods. The photonic quantum circuit, for example, Xanadu (Xanadu and all Xanadu-based trademarks and logos are trademarks or registered trademarks of Xanadu Quantum Technologies, Inc. and/or its affiliates), contains interferometers and squeezing gates that may mimic the weighing functions of a neural network, a displacement gate acting as a bias or a non-linear transformation similar to a rectified linear unit (ReLU) function of a neural network. A rectified linear unit (ReLU) function may include an activation function that is partially linear or that will create an output for a positive input and a zero if the input is not positive.

An evaluation may occur at the next time a new code is assessed. The assessment may include a scanning of the code and a determination based on which path to consider regarding classification. The same pieces or sections of code may continually be evaluated as the behavior of the system may be changing. For example, if the quantum computer is busy, a parallel conversion program will have to wait. The result of a busy quantum computer may boost the neural network classification of moving the quantum code to classical computing.

A reinforcement model may be used to analyze a dynamic user's preference of switching the code blocks or the functions from quantum computing to classical computing and the user's choice may be stored on a cloud databased for future referencing.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a parallel conversion program 110a. The networked computer environment 100 may also include a server 112 that is enabled to run a parallel conversion program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Analytics as a Service (AaaS), Blockchain as a Service (BaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the parallel conversion program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the parallel conversion program 110a, 110b (respectively) to determine which classical code may be converted to quantum code. The parallel conversion method is explained in more detail below with respect to FIGS. 2 and 3.

Figure 2:
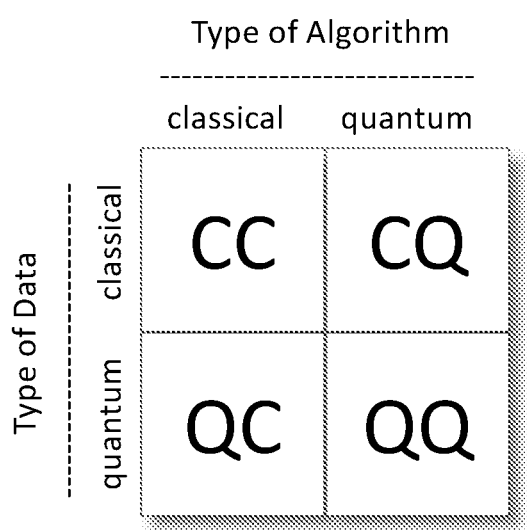
FIG. 2 is a block diagram of a parallel conversion categorization chart according to at least one embodiment.

Referring now to FIG. 2, a block diagram of a parallel conversion categorization chart 200 used by the parallel conversion program 110a, 110b according to at least one embodiment is depicted. The parallel conversion chart may use machine learning to categorize whether a code block should be performed in a classical computing environment or a quantum computing environment. Different types of machine learning may be used, such as deep learning, a feedforward neural network (FNN) or a recurrent neural network (RNN). The parallel conversions categorization chart 200 may be used to identify optimal conditions as to whether the system or code block that is being processed or that will be processed should use classical processing or quantum processing.

The choices for the type of algorithm in the parallel conversion categorization chart 200 may include a classical algorithm or a quantum algorithm. A classical algorithm may include an algorithm that may run on a classical computing environment and that provide a finite set of sequence instructions performed on a classical computing device. A quantum algorithm may include an algorithm that may also perform a sequence of instructions, however, the quantum algorithm may be performed on a quantum computer. For example, Shor's algorithm and Grover's algorithm, both algorithms performing computations much faster than a classical algorithm.

The choices for the type of data in the parallel conversion categorization chart 200 may include classical data or quantum data. Classical data may include conventional data used to train a machine learning, deep learning or neural network model. Quantum data may include using the output data from a quantum computing device to train a machine learning, deep learning or neural network model.

A classical type of data with a classical type of algorithm (CC) may represent classical data being processed on a classical computing environment. A CC category may include a classical machine learning.

A quantum type of data with a classical type of algorithm (QC) may represent quantum data processed on a classical computing environment. A QC category may include using quantum variants of learning algorithms in a classical computing environment.

For a classical type of data with a quantum type of algorithm (CQ) may represent classical data being processed on a quantum computing device. A CQ category may include using classical machine learning for quantum tasks or experiments in a quantum computing environment.

A quantum type of data with a quantum type of algorithm (QQ) may represent quantum data being processed on a quantum computing device. A QQ category may include a quantum variant learning algorithm on a quantum computing device.

Figure 3:
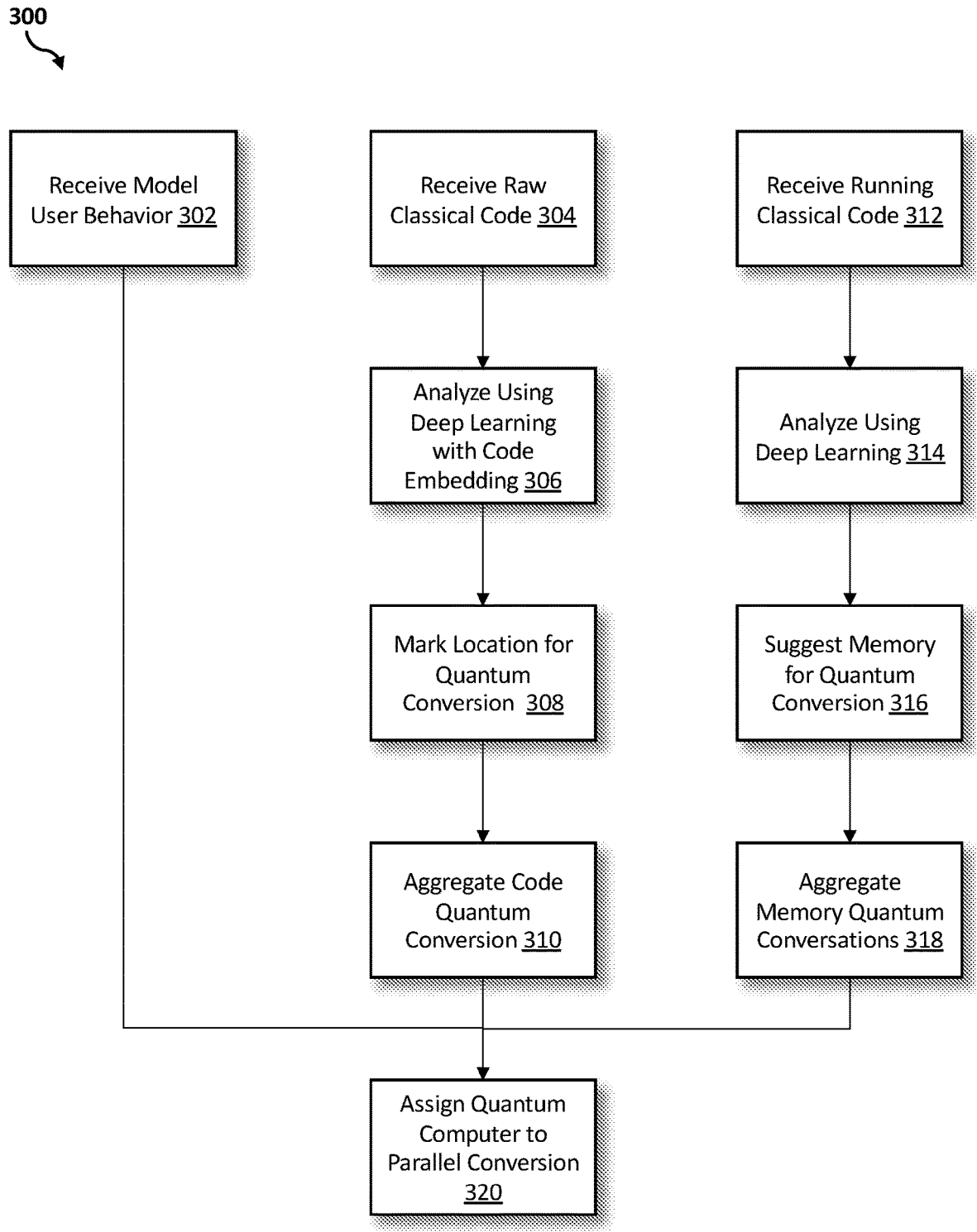
FIG. 3 is an operational flowchart illustrating a parallel conversion assignment process according to at least one embodiment.

Referring now to FIG. 3, an operational flowchart illustrating the exemplary a parallel conversion assignment process 300 used by the parallel conversion program 110a, 110b according to at least one embodiment is depicted. The parallel conversion assignment process may use machine learning for assigning a quantum computer to each parallel conversion.

At 302, model user behavior is received. User behavior may be collected and measured using, for example, a smart watch or wearable computing devices that collects biometric signals such as heartbeat or retina variability and infrared or thermo grams. For example, if the heartbeat raises, then the number of shots increases. Infrared or thermo grams may be analyzed by deep learning algorithms.

At 304, raw classical code is received. The raw classical code may be received by a service endpoint. The raw classical code may include code or a section of code for analysis. The service endpoint may include a specific service that the user is gaining access to, such as a website address or a uniform resource locator (URL).

At 306, the raw classical code is analyzed using deep learning with code embedding. Code embedding or a code embedded deep learning model may allow for large inputs and analysis and for reuse across multiple deep learning models. For example, a pretrained deep learning analysis may include a program application that provides fantasy football predictions, stock market analysis and medically diagnosed disease monitoring. The program application code is analyzed to identify whether or not the classical code may be converted to quantum code.

At 308, a location for quantum conversion is marked. The location may be marked, for example, using annotations or tokens. NLP may use tokens or annotations to mark locations by using, for example, tags or token tags in the code.

At 310, code quantum conversions are aggregated. The code quantum conversions may be aggregated by, for example, a quantum application crawler that searches code.

At 312, running classical code is received. The classical code may be received by, for example, a system monitoring application. The classical code may be running from an executing binary when received the system monitoring application.

At 314, the classical code is analyzed using deep learning. The deep learning analysis may determine the viability of the classical code to be used for or to be a good fit for a quantum code conversion. For example, the TO operations or the memory operations may be predictors that determine if the classical code should be transformed or changed to quantum code.

At 316, memory for quantum conversion is suggested. The suggestion relating to memory size for a quantum conversion may include an output created by the deep learning algorithm.

At 318, memory quantum conversations are aggregated. The aggregation relating to the quantum conversion may include, for example, determining a memory use rate of change. The memory use rate of change may be calculated using a summation over the aggregated conversions. The system monitoring application may provide the net memory usage trended over time.

At 320, a quantum computer is assigned to the parallel conversion. The quantum computer is assigned to the parallel conversion by selecting a quantum algorithm from a library and replacing the classical computing code with the quantum code. Additionally, a quantum computer may be assigned to the code block based on quantum resource availability.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

Figure 4:
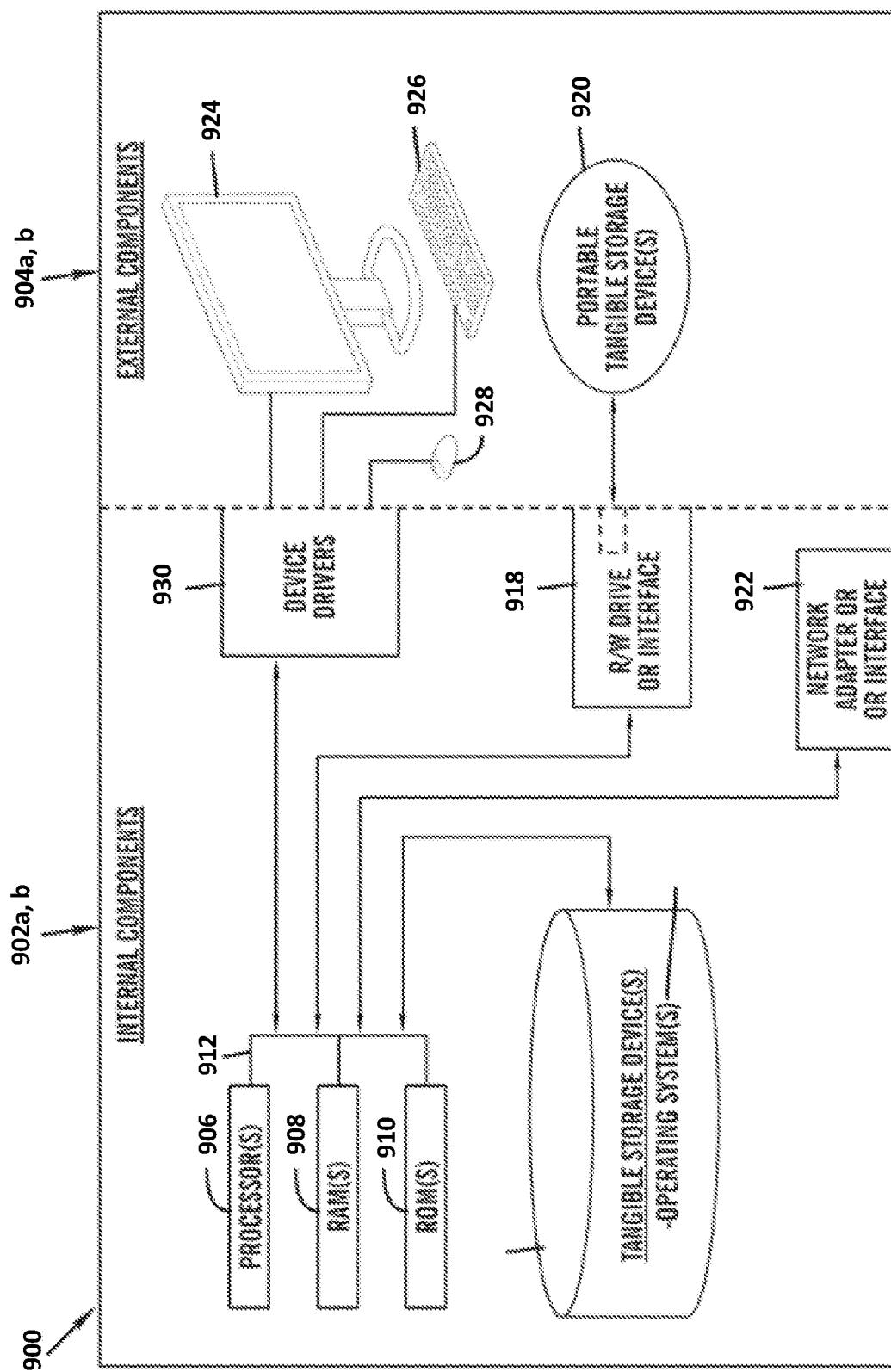
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 4. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the parallel conversion program 110a in client computer 102, and the parallel conversion program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the parallel conversion program 110a, 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the parallel conversion program 110a in client computer 102 and the parallel conversion program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the parallel conversion program 110a in client computer 102 and the parallel conversion program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure or on a hybrid cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
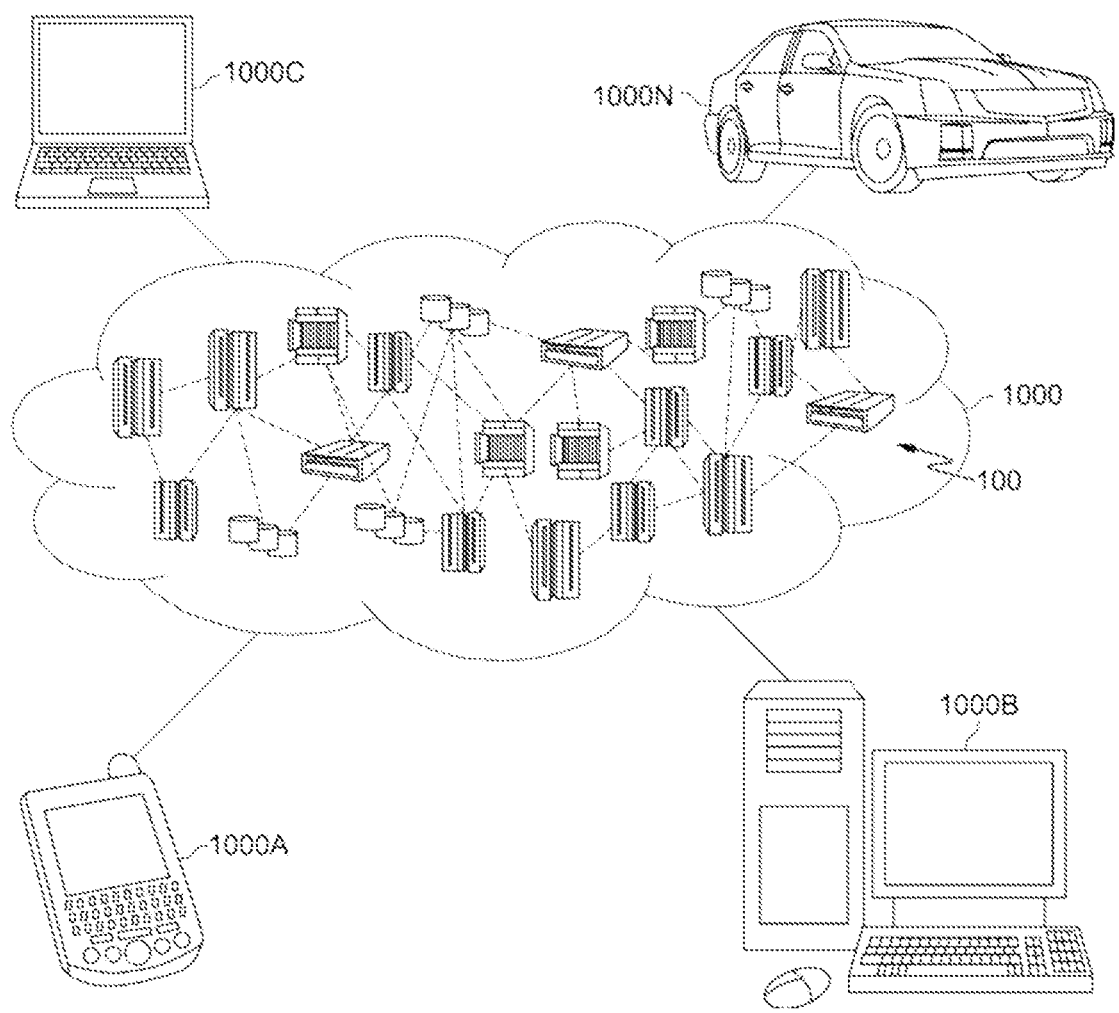
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
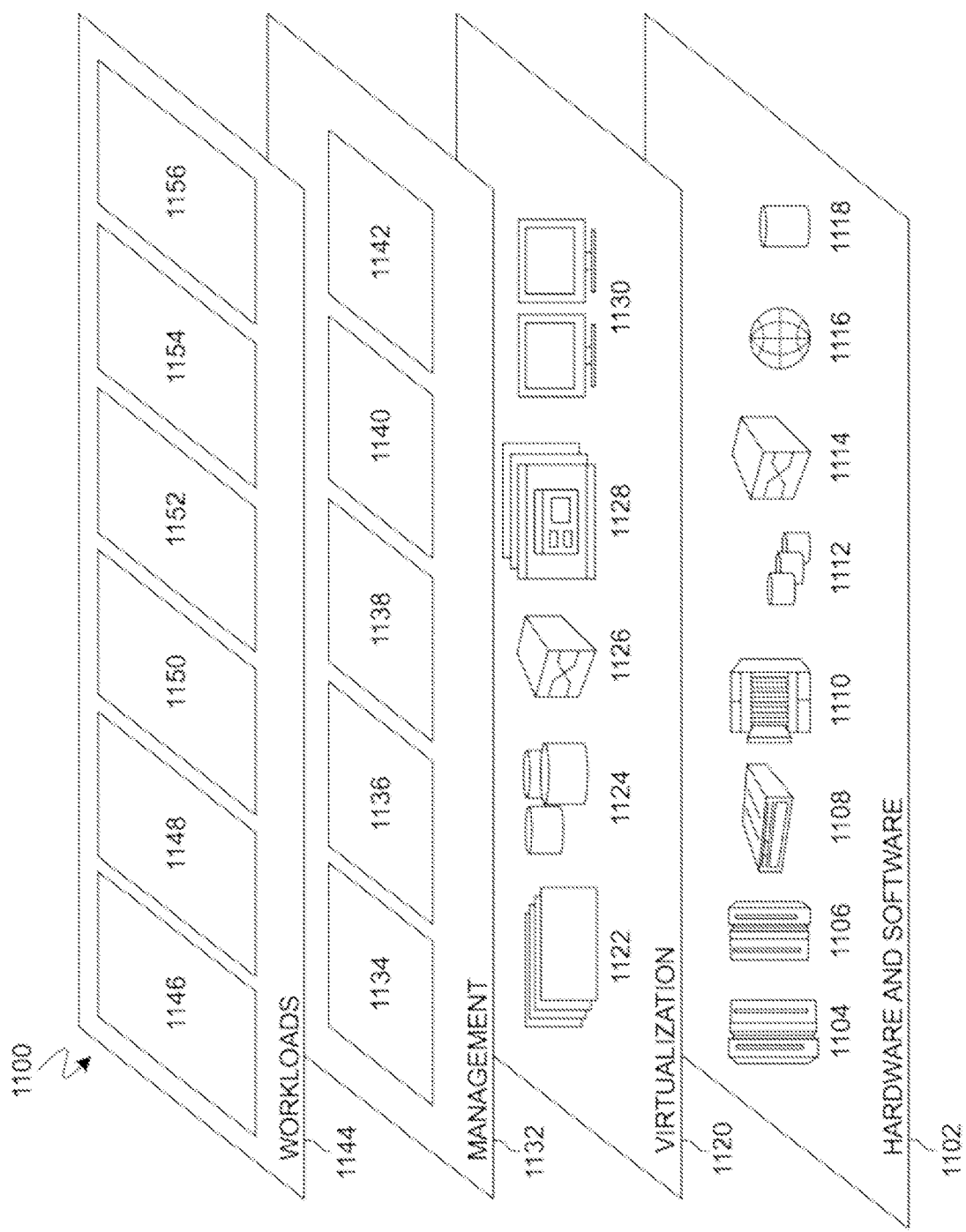
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and parallel conversion 1156. A parallel conversion program 110a, 110b provides a way to determine which classical code may be converted to quantum code.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for parallel conversion, the method comprising:
   analyzing raw classical code using a deep learning model with a code embedding;
   marking a location of the raw classical code for a first quantum conversion based on the analysis of the raw classical code;
   analyzing running classical code that is running from an executing binary using the deep learning model;
   suggesting a memory size of the running classical code for a second quantum conversion based on the analysis of the running classical code;
   aggregating the raw classical code for the first quantum conversion based on the marking;
   aggregating the running classical code for the second quantum conversion based on the suggesting; and
   assigning a quantum computer to a parallel conversion by replacing classical computing code with quantum code during runtime based on the aggregated raw classical code and the aggregated running classical code.

2. The method of claim 1, further comprising: receiving a user behavior measurement associated with a user behavior of a user; receiving the raw classical code; receiving the running classical code; and assigning the quantum computer to the parallel conversion based on the received user behavior measurement, the aggregated raw classical code and the aggregated running classical code.

3. The method of claim 1, wherein the location of the raw classical code is marked using natural language processing annotations.

4. The method of claim 2, wherein the user behavior is measured using biometric data received from the user via a sensor.

5. The method of claim 2, wherein the quantum computer is assigned to a code block based on a quantum resource availability.

6. A computer system for parallel conversion, comprising:
   one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
   analyzing raw classical code using a deep learning model with a code embedding;
   marking a location of the raw classical code for a first quantum conversion based on the analysis of the raw classical code;

analyzing running classical code that is running from an executing binary using the deep learning model;

suggesting a memory size of the running classical code for a second quantum conversion based on the analysis of the running classical code;

aggregating the raw classical code for the first quantum conversion based on the marking;

aggregating the running classical code for the second quantum conversion based on the suggesting; and assigning a quantum computer to a parallel conversion by replacing classical computing code with quantum code during runtime based on the aggregated raw classical code and the aggregated running classical code.

7. The computer system of claim 6, further comprising: receiving a user behavior measurement associated with a user behavior of a user; receiving the raw classical code; receiving the running classical code; and assigning the quantum computer to the parallel conversion based on the received user behavior measurement, the aggregated raw classical code and the aggregated running classical code.

8. The computer system of claim 6, wherein the location of the raw classical code is marked using natural language processing annotations.

9. The computer system of claim 7, wherein the user behavior is measured using biometric data received from the user via a sensor.

10. The computer system of claim 7, wherein the quantum computer is assigned to a code block based on a quantum resource availability.

11. A computer program product for parallel conversion, comprising:
one or more computer-readable tangible storage media and program instructions stored on at least one of the one or more computer-readable tangible storage media, the program instructions executable by a processor to cause the processor to perform a method comprising:

analyzing raw classical code using a deep learning model with a code embedding;

marking a location of the raw classical code for a first quantum conversion based on the analysis of the raw classical code;

analyzing running classical code that is running from an executing binary using the deep learning model;

suggesting a memory size of the running classical code for a second quantum conversion based on the analysis of the running classical code;

aggregating the raw classical code for the first quantum conversion based on the marking;

aggregating the running classical code for the second quantum conversion based on the suggesting; and assigning a quantum computer to a parallel conversion by replacing classical computing code with quantum code during runtime based on the aggregated raw classical code and the aggregated running classical code.

12. The computer program product of claim 11, further comprising: receiving a user behavior measurement associated with a user behavior of a user; receiving the raw classical code; receiving the running classical code; and assigning the quantum computer to the parallel conversion based on the received user behavior measurement, the aggregated raw classical code and the aggregated running classical code.

13. The computer program product of claim 11, wherein the location of the raw classical code is marked using natural language processing annotations.

14. The computer program product of claim 12, wherein the user behavior is measured using biometric data received from the user via a sensor.

* * * * *